US006986076B1

(12) United States Patent
Smith et al.

(10) Patent No.: US 6,986,076 B1
(45) Date of Patent: Jan. 10, 2006

(54) PROACTIVE METHOD FOR ENSURING AVAILABILITY IN A CLUSTERED SYSTEM

(75) Inventors: Norman Roy Smith, Lake Forest, CA (US); Prabhakar Krishnamurthy Vellore, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 661 days.

(21) Appl. No.: 10/156,486

(22) Filed: May 28, 2002

(51) Int. Cl.
  *G06F 11/00* (2006.01)
(52) U.S. Cl. ......................................................... 714/4
(58) Field of Classification Search ................... 714/4, 714/13, 47
  See application file for complete search history.

(56) References Cited

U.S. PATENT DOCUMENTS

| 5,287,453 | A | 2/1994 | Roberts |
| 5,426,774 | A | 6/1995 | Banerjee et al. |
| 5,483,637 | A | 1/1996 | Winokur et al. |
| 6,078,957 | A | 6/2000 | Adelman et al. |
| 6,088,727 | A | 7/2000 | Hosokawa et al. |
| 6,353,902 | B1 * | 3/2002 | Kulatunge et al. ........... 714/712 |
| 6,446,218 | B1 * | 9/2002 | D'Souza ........................ 714/4 |
| 6,526,521 | B1 * | 2/2003 | Lim ............................. 714/4 |
| 2003/0051187 | A1 * | 3/2003 | Mashayekhi et al. .......... 714/4 |

* cited by examiner

*Primary Examiner*—Scott Baderman
(74) *Attorney, Agent, or Firm*—Alfred W. Kozak (57) ABSTRACT

The method of the present invention is useful in a computer system including at least two server nodes, each of which can execute clustered server software. The program executes a method for monitoring failure situations to reduce downtime. The method includes the step of detecting an event causing one of the failure situations, and then the method determines if the event affects one of the server nodes. If it is determined the event does affect one of the server nodes, the method then determines if the event exceeds a threshold value. If it is determined the event exceeds a threshold value, the method executes a proactive failover. If the event is not specific to a cluster node, but indicates an impending or actual failure of the cluster software, the method identifies and initiates an appropriate action to fix the condition or provide a workaround (if available) that will preempt an impending failure of the cluster system or would enable a restarting of a failed cluster software.

9 Claims, 9 Drawing Sheets

FIG. 2A
MAIN

FIG. 2B
MAIN

FIG. 3
LISTEN PROCESS

FIG. 4
LISTEN SNMP PROCESS

FIG. 5
LISTEN EVENT LOG
PROCESS

*FIG. 6*
PERFORM FAILOVER

PROACTIVE METHOD FOR ENSURING AVAILABILITY IN A CLUSTERED SYSTEM

FIELD OF THE INVENTION:

The present invention generally relates to the field of clustered computer systems and in particular to a method for monitoring a clustered system for a variety of failure situations and automatically taking the necessary actions to reduce downtime of the cluster and applications that are cluster-enabled. The cluster systems are based on Microsoft Cluster Service (MSCS) software running under Microsoft Windows operating systems.

CROSS REFERENCES TO RELATED APPLICATIONS

This application is related to the following co-pending applications which are incorporated herein by reference:

U.S. Ser. No. 10/143,408 entitled "Method for Reducing Spurious Failovers in a Geographically Dispersed Clustered System".

U.S. Ser. No. 09/892,276 entitled "Failover of a Simulated System in a Clustered Computing Environment".

BACKGROUND OF THE INVENTION

With the advent of enterprise servers came the increased demand for applications residing on the servers to be mission-critical. Growing dependence on such servers and applications has left little tolerance for downtime in computing environments. High-availability computing, once considered a strategic advantage, has now become a tactical necessity. The need for a 99.999% availability means that mission-critical applications cannot be down for more than a few minutes over the span of an entire year.

One example of a mission-critical application is the customer and product database server of an online retail store. Because the store's customers can place orders at any conceivable hour of the day, and the site deals with multiple time zones, the database must be available for 24 hours a day, 7 days a week. Any downtime has a direct effect on store's sales and profits.

An enterprise system consisting of only one server has the potential for taking a long time to restore from a failure. While the server is down, all programs and resources on that server are unavailable to the users. Because the availability of the server is directly related to whether or not the server is running, this type of system configuration is not acceptable for mission-critical applications.

By clustering two server nodes to appear as one logical server, Microsoft Cluster Service (MSCS) provides a simple solution for availability for Microsoft Windows server systems. When one server fails in a clustered system, applications running in the form of cluster resources and owned by the failed server are taken over by the surviving node, thus minimizing the application downtime. This process is referred to as failover.

The time needed for the resources from a failed server to transfer and resume on the surviving server is determined by a variety of factors and ranges from a few seconds to up to 30 minutes or even longer in some situations. This is still unacceptable for mission-critical applications. Thus the need arises to expedite failover when a failure occurs or is imminent in a MSCS cluster.

Also, the Cluster (MSCS) itself is prone to failures because of various hardware and software reasons. Each time the cluster goes down, it brings down the applications that are configured to run under the cluster environment. The fixes required in many of these situations are reasonably complex, time consuming (if performed manually) and require attention of an experienced cluster administrator. Thus the need arises for monitoring a MSCS cluster for such critical cluster failures, executing automated-fixes, whenever possible, and notifying operations personnel of failures, together with possible solutions, all to avoid long error detection and resolution processes.

One prior art method to which the method of the present invention generally relates is described in U.S. Pat. No. 6,088,727 entitled CLUSTER CONTROLLING SYSTEM OPERATING ON A PLURALITY OF COMPUTERS IN A CLUSTER SYSTEM. This prior art method is a cluster controlling system that transfers packages which have been operating on one computer to another computer when a fault or failure has occurred by monitoring and controlling the packages in the entire system. When the respective packages are started-up, cluster daemons on the respective computers monitor and control resources on the operating computers. The monitored and controlled data are stored in the respective computers as local data. A manager communicates with cluster daemons on the respective computers, and stores data in a global data memory to monitor and control the entire system. The manager is actually one of the packages operating in the cluster system. If a fault or failure occurs in the manager or in the computer running the manager, the manager is re-started on another computer by a cluster daemon. A "daemon" is a program that performs a utility (housekeeping or maintenance) function without being requested or even known by the user. A daemon sits in the background and is called into play only when needed—for example, to help correct an error from which another program cannot recover.

The present invention differs from this prior art in that the prior invention focuses on restoring a failed application (package) on a different cluster node after the occurrence of a failure. It is not clear if the prior invention addresses cluster node failures and cluster software failures, or just package failures. The present invention is aimed at monitoring for "impending" system or cluster failures and, in the case of system failures, initiating proactive failover "before" the occurrence of an actual failure. A proactive failover takes less time than a failover initiated by application failure. The reduced failover time results in decreased application downtime.

Another prior art method to which the method of the present invention generally relates is detailed in U.S. Pat. No. 5,287,453 entitled FAST REMOTE FILE ACCESS FACILITY FOR DISTRIBUTING FILE ACCESS REQUESTS IN A CLOSELY COUPLED COMPUTER SYSTEM. The method of the prior invention includes a plurality of independently operated computer systems located in close proximity to each other. Each system includes a system bus, a memory, and a set of local peripheral devices which connect in common to the system bus. The computer systems are interconnected for transferring messages to each other through the channels of a high speed cluster controller which connect to the system buses. Each system further includes a cluster driver which transfers the messages between the memory of the computer system and the corresponding cluster controller channel when the system is configured to operate in a cluster mode of operation. User application programs issue monitor calls to access files contained on a peripheral device(s). The fast remote file access (FRFA) facility included in each system, upon detecting that the peripheral device is not locally attached, packages the monitor call and information identifying the user application into a message. The message is transferred through the cluster driver and cluster controller to the FRFA of the computer system to which the peripheral device attaches. The monitor call is executed and the response is sent back through the cluster controller and delivered to the user application in a manner so that the peripheral device of the other computer systems appears to be locally attached and the monitor call appears to be locally executed.

The present invention differs from that prior art in that the prior invention deals with making remote cluster peripheral devices appear as local. The present invention, on the other hand, deals with application availability and downtime issues.

Yet another prior art method to which the method of the present invention generally relates is detailed in U.S. Pat. No. 6,078,957 entitled METHOD AND APPARATUS FOR A TCP/IP LOAD BALANCING AND FAILOVER PROCESS IN AN INTERNET PROTOCOL (IP) NETWORK CLUSTERING SYSTEM. The prior art method is a method and apparatus for monitoring packet loss activity in an Internet Protocol (IP) network clustering system which can provide a useful, discrete and tangible mechanism for controlled failover of the TCP/IP network cluster system. An adaptive interval value is determined as a function of the average packet loss in the system, and this adaptive interval value used to determine when a cluster member must send a next keepalive message to all other cluster members, and wherein the keepalive message is used to determine network packet loss.

The present invention differs from this prior art in that the prior invention deals with monitoring for loss of data during network transfer between cluster nodes and determining ways to minimize such loss. The prior invention relates to cluster downtime arising out of network problems. The present invention, however, focuses on issues arising out of operating system, application and cluster software failures.

Yet another prior art method to which the method of the present invention generally relates is detailed in U.S. Pat. No. 5,426,774 entitled METHOD FOR MAINTAINING A SEQUENCE OF EVENTS FUNCTION DURING FAILOVER IN A REDUNDANT MULTIPLE LAYER SYSTEM. The prior art method involves a process control system having a redundant multilayer hierarchical structure, where each node of a layer being redundant sequence of events inputs is received from field devices by an input/output processor (IOP). The IOP is a digital input sequence of events (DISOE) IOP, the IOP being the lowest layer of the hierarchical structure. The IOP interfaces with a controller at the next layer of the hierarchy. This method for reliably maintaining a sequence of events functions during a failover of any of the redundant nodes, involves the steps of maintaining a log, a circular list, by the local DISOE. The circular list is a rolling log of all sequence of events data for a predefined time period. When a failover occurs, the new primary commands an event recovery. The event recovery process freezes the log and uses the information in the log to recreate the events data. The freeze operation inhibits background-purge activity for the log thereby avoiding the deletion of information past the defined time. New events data is still entered in the log. Once the log has been processed, the freeze operation is negated. The recreated data is transmitted to the controller in accordance with a predefined protocol, thereby avoiding the loss of any events data as a result of the failover.

The present invention differs from this prior art in that the prior invention deals with handling of an event's data during a failover related to a multi-layer process control system. The prior invention, unlike the present invention, does not relate to computer cluster systems that host enterprise software applications for high-availability. In addition, the present invention does not deal with application data directly. Instead, the present invention communicates with software applications through MSCS cluster software.

Yet another prior art method to which the method of the present invention generally relates is detailed in U.S. Pat. No. 5,483,637 entitled EXPERT BASED SYSTEM AND METHOD FOR MANAGING ERROR EVENTS IN A LOCAL AREA NETWORK. In this prior art method, an expert based system for managing error events in a local area network (LAN) is described. The system includes an inference engine and a knowledge base storing data defining a plurality of causal relationships. Each of the causal relationships associates an error message with a cause, at least one implied relationship, and at least one trigger relationship. The inference engine accesses the knowledge base in response to a receiver error message to identify the error message and retrieve from the knowledge base its possible causes. The received error message is compared with other already received error messages to filter out repeated error messages. Already received error messages are examined to determine whether a triggering error message has arrived and, if so, the received error is discarded. The received error message is compared with existing diagnostic problems, termed a cluster, to determine if the received error message shares common causes with all error messages in the cluster and, if so, the received error message is added to the cluster. The causes in a cluster are evaluated to determine whether one cause in a cluster implies another cause and, if so, the implied cause is discarded. A user interface connected to the inference engine is used for reporting problems including correlated error messages, a cause and a recommended action for fixing the cause.

The present invention differs from this prior art in that the prior invention relates to detecting problems or errors in a LAN environment and providing feedback to the user about possible fixes. The likely goal of the prior invention is to help the user troubleshoot LAN errors. The present invention, on the other hand, operates on a Microsoft Windows Cluster (based on MSCS), and addresses application availability, as opposed to LAN availability. In addition, the present invention executes actions (including pro-active failover) that lessen application downtime.

SUMMARY OF THE INVENTION

It is therefore an object of the present invention to monitor system and cluster events in a clustered system for possible failures.

Still another object of the present invention is to initiate cluster and other actions proactively when an impending server or cluster failure is detected, thus reducing downtime of cluster applications.

Still another object of the present invention is to make an application residing on a clustered server available sooner on the surviving node following a server failure.

Still another object of the present invention is to combine system event monitoring with failover abilities in a clustered system.

Still another object of the present invention is to automate some of the troubleshooting associated with MSCS, thus reducing cluster downtime.

The method of the present invention is useful in a computer system including at least two server nodes, each of which can execute clustered server software. The program executes a method for monitoring indications of impending failure situations to reduce downtime. The method includes the step of detecting an event causing one of the failure situations. Next, the method determines if the event affects one of the server nodes. If it is determined the event does affect one of the server nodes, the method then determines if the event exceeds a threshold value. If it is determined the event exceeds a threshold value, the method executes a proactive failover.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF PREFERRED EMBODIMENT

The method of the present invention monitors for server and cluster failures (and thus, any application failures), both actual and imminent failures, proactively. Depending on the symptoms of a particular failure, the method initiates one or more actions in order to reduce downtime. An example of this method is described below to address a server node failure. The method of proactively monitoring for actual and imminent failures of server and cluster and initiating actions to reduce downtime is not limited to this example, however.

In this example, one may consider a clustered system where a particular software application is misbehaving and depleting virtual memory on one of the two server nodes. If the misbehaving application continues to deplete virtual memory, the server will eventually fail. The cluster application(s) and all other resources residing on the failed server will transfer to and resume on the surviving node. As discussed above, the time between the effective loss of application service from one node, and the resumption of service from the failover node can be very long in some cases before the application is completely available to its clients again. For mission-critical standards, this is unacceptable. A database in the middle of a large number of long running transactions is an example and will be used subsequently herein. The diagram of FIG. 1B shows various stages involving the failover scenario described above.

To reduce downtime, the method of the present invention capitalizes on a user-initiated failover. Failover is not just limited to situations when one of the servers fails. Failover can also occur programmatically. In other words, a failover can occur when a resource on one node is transferred to another surviving cluster node via a user or a program request. Instead of a server failure initiating the failover, the transfer of resources occurs upon a request by the user program. A user-initiated failover initiated when both cluster nodes are in the normally operating and responsive state generally completes within a few seconds, as opposed to a few minutes when one of the servers stops responding.

The present method monitors for clustered system situations where one server is losing virtual memory. When the virtual memory usage reaches a pre-set threshold, and before the affected server actually fails, the method of the present invention initiates a failover, thus resulting in a faster failover transfer thereby reducing downtime of the affected applications in the cluster. The diagram of FIG. 1C shows various stages involving the failover scenario using the present method.

In repeated lab experiments, a standard method is tested on a 3-tier SAP application using Microsoft SQL Server 2000 running in a cluster environment. A virtual memory-consuming program is started that would eventually drain the memory resource on the cluster nodes where the SQL Server is currently owned. When memory usage reaches extreme levels (about 90–95%), the SQL Server stops responding. More than four minutes elapses (on average) before MSCS would move the SQL Server applications to another server node and eventually bring it online on the second node. However, when the present method is employed (with the memory threshold value set at 85%), the failover time is 90 seconds (on average) and was found to never exceed 2 minutes. These results are based on about 300 concurrent users of the SAP application (which is below typical use of an enterprise application). The recovery times are expected to weigh even more positively towards the present method as the number of users goes higher.

As demonstrated by the above example, the method of the present invention is a proactive approach to handling server and cluster failures. Depending on the symptoms of a particular failure, the method initiates one or more actions in order to reduce downtime of the cluster and its applications.

While the focus of this method is on server failures, the following will provide an example that illustrates how cluster failures can be addressed in the form of an automated fix. Consider a situation where there is insufficient disk space remaining in the quorum device that will result in inconsistent behavior of the cluster (a quorum device is a shared cluster disk that contains critical information about the MSCS cluster, without which a cluster cannot operate). When this situation occurs, the cluster service writes an event (with event id of 1021) to the Windows system event log. The present method, monitoring for such events (as described in FIG. 5), captures the above event and thus detects the impending Cluster service failure. In this case, one possible fix could be to designate another disk with adequate free space as the quorum device. This can be done programmatically by issuing an appropriate function call (Cluster API) to the Cluster service. By executing this automatic fix, the current method allows the cluster administrator to attend to the actual problem at a later convenient time, without compromising on the health of the cluster and applications that depend on it.

Figure 1A:
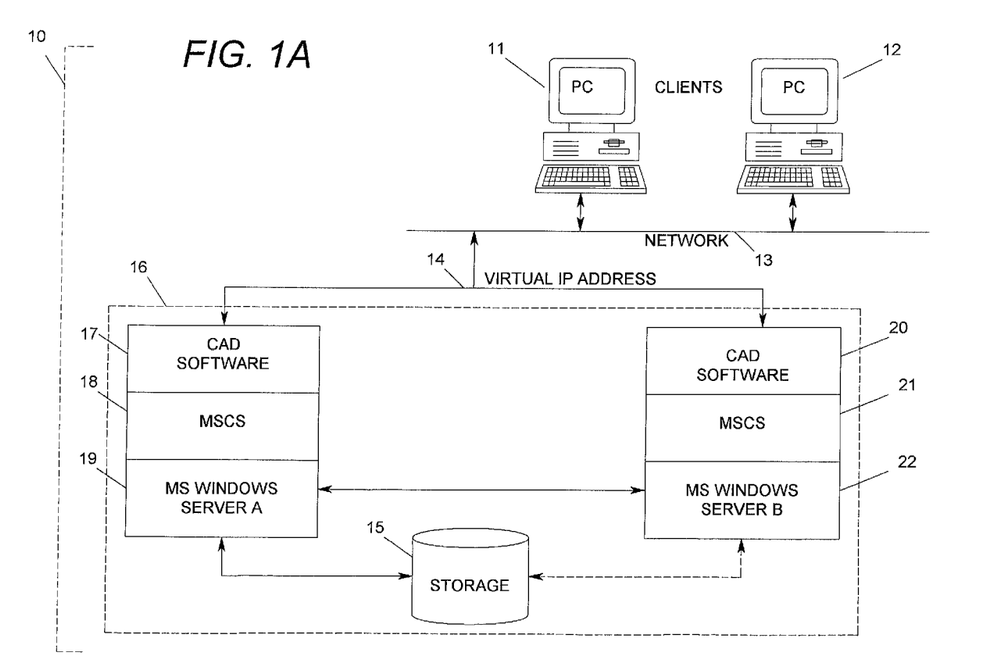
FIG. 1A is a generalized block diagram of a system that may use the method of the present invention.
Figure 1B:
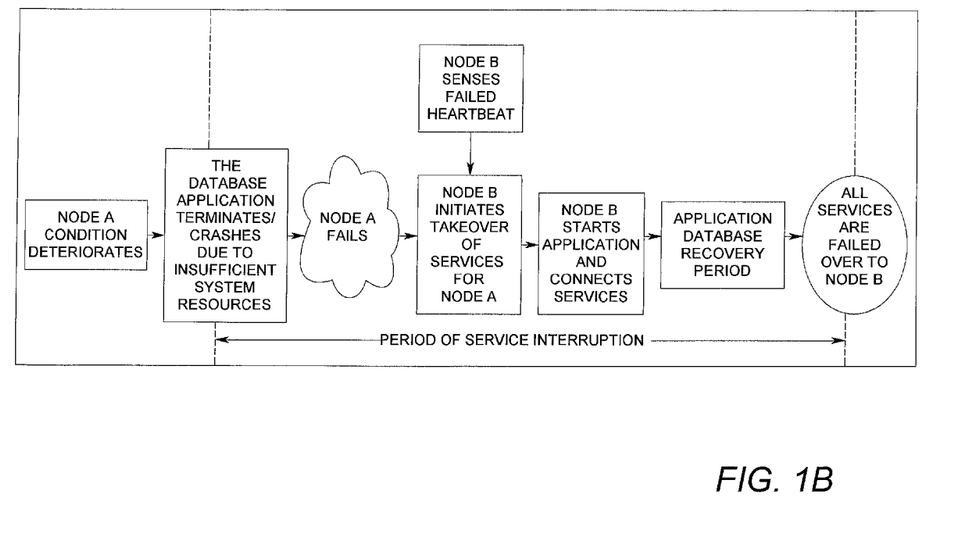
FIG. 1B is a diagram of a standard failover sequence.
Figure 1C:
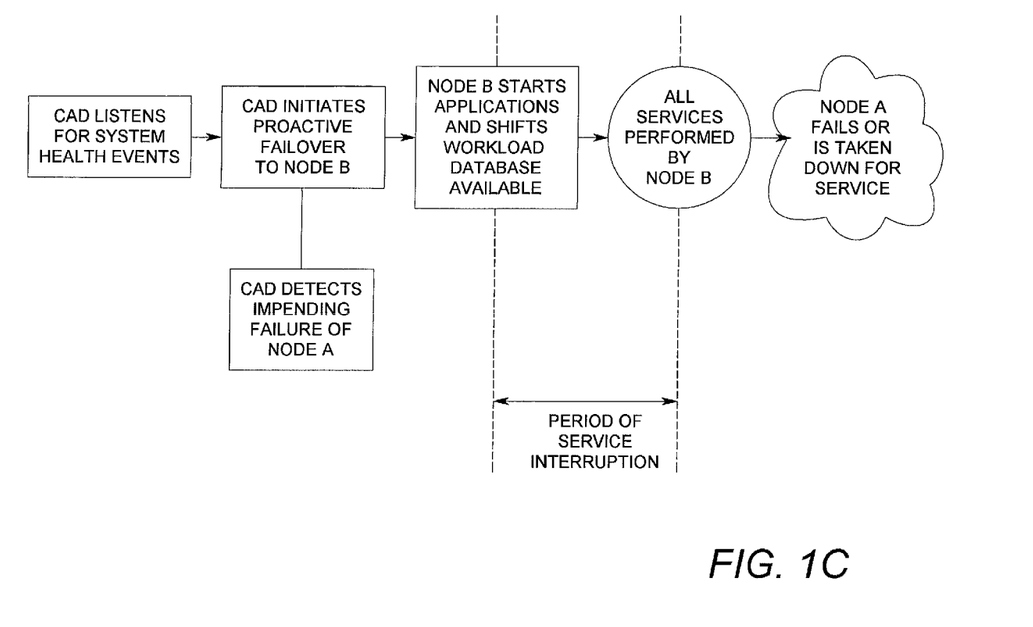
FIG. 1C is a diagram illustrating the new failover sequence of the present method.

Referring now to the drawings and FIG. 1A in particular, a block diagram of a computer system is shown of a client-server network 10 including PC clients 11 and 12, and a clustered server 16 typically executing Microsoft Windows Operating system, which is available from Microsoft Corporation, Redmond, Wash. PC clients 11 and 12 are connected via a network 13 and interface with the clustered server 16 through a virtual IP address 14. The clustered server 16 contains two nodes designated Microsoft (MS) Windows Server A 19 and MS Windows Server B 22. MS Windows Server A 19 is further comprised of Microsoft Cluster Server (MSCS) software 18, and Cluster Application Defender (CAD) software 17. CAD software 17 is software implementing the method of the present invention. MS Windows Server B 22 contains software similar to MS Windows Server A, namely MSCS 21 and CAD software 20. MS Windows Server A and MS Windows Server B share a common storage device 15, where only one server can access the storage device 15 at a given time.

FIG. 1B shows a standard Failover Sequence where Node A deteriorates and the database application terminates. Node A fails and Node B takes over services for Node A. After a recovery period, all services are handled by Node B.

FIG. 1C illustrates the new Failover Sequence where the Cluster Application Defender (CAD) listens for events, detects an impending failure in Node A and initiates proactive transfer to Node B. Node B starts processing of Applications and shifts the workload to Node B before Node A fails or is taken down.

Figure 2A:
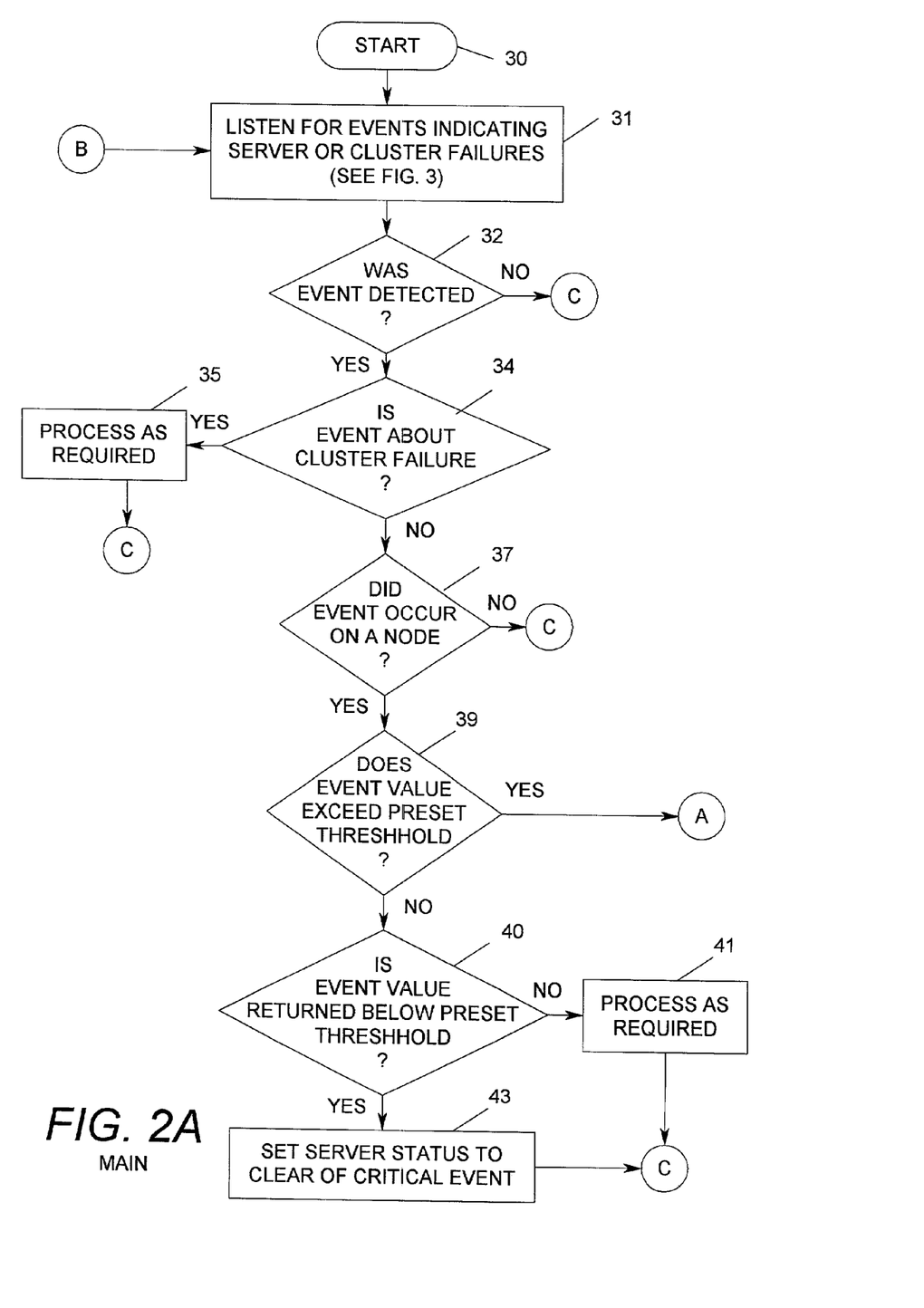
FIGS. 2A and 2B combined form a flowchart that illustrates the high-level process for a proactive failover.
Figure 2B:
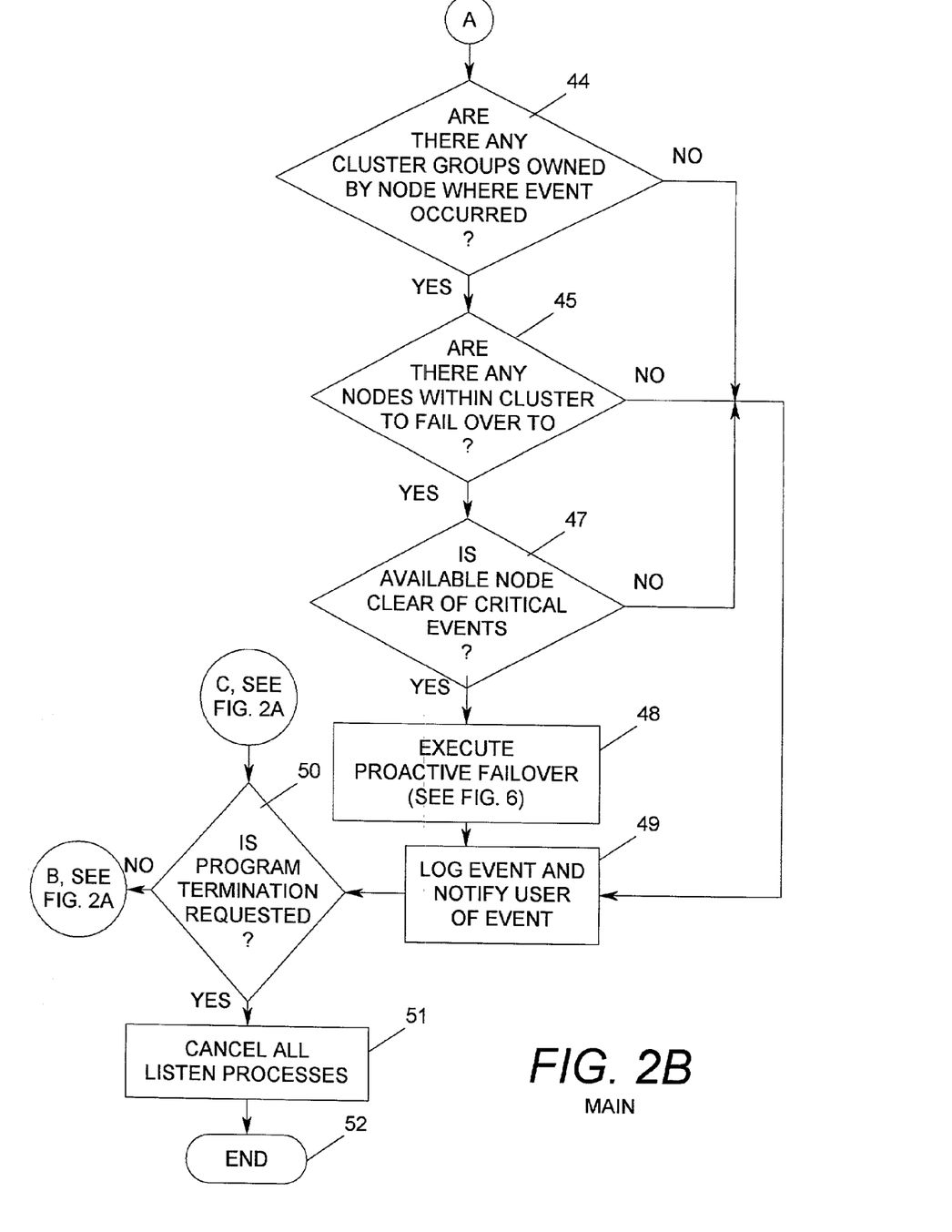

FIG. 2 is a flowchart detailing the high-level steps for a proactive failure. FIG. 2 is comprised of FIGS. 2A and 2B.

With reference to FIG. 2A, the process begins with start bubble 30 followed by a process step (block 31) to listen for events indicating server or cluster failures. The listen process is further described in FIG. 3. The process continues with an inquiry as to whether or not an event was received during the listen process (diamond 32). If the answer to this inquiry is no, the process exits (C) to FIG. 2B, diamond 50. If the answer to diamond 32 is yes, the process continues with an inquiry as to whether or not the event is related to cluster failure (diamond 34). If the answer to this inquiry is yes, the process handles the cluster failure as required (block 35) and proceeds via (C) to FIG. 2B, diamond 50. When processing an event as required, an action is taken based upon the particular event type, of which there can be many. The process (no on diamond 34) continues with an inquiry as to whether the event occurred on one of the MSCS cluster nodes (diamond 37). If the answer to this inquiry is no, the process steps to diamond 50 of FIG. 2B. If the answer to this inquiry in 37 is yes, the process continues with an inquiry as to whether or not the event exceeds a preset threshold value for an operating system parameter, thus indicating unacceptable positions (diamond 39). If the answer to this inquiry is yes, the process continues via marker A as described in FIG. 2B. If the answer to this inquiry is no, the process continues with an inquiry as to whether or not the event about the server node is returning below a preset threshold value for an operating system parameter, thus indicating acceptable server health conditions (diamond 40). If the answer to this inquiry is no, the event is processed as required via diamond 50, FIG. 2B. There are many available possibilities for processing an event as required. If the answer to the inquiry posed by diamond 40 is yes, the process sets the server status to "clear" of any critical events (block 43). The process then steps via (C) to diamond 50, FIG. 2B.

Now referring to FIG. 2B, the process from FIG. 2A continues with a inquiry as to whether or not there are any cluster applications, also referred to as "cluster groups," owned by the server where the event occurred (diamond 44). If the answer to this inquiry in 44 is no, the process steps to block 49. If the answer to this inquiry is yes, the process continues with an inquiry as to whether or not there are any cluster nodes within the cluster available to failover the cluster groups to (diamond 45). If the answer to this inquiry in 45 is no, the process steps to block 49. If the answer to this inquiry in 45 is yes, the process continues with an inquiry as to whether or not the available node is clear of critical events (diamond 47). If the answer to this inquiry is no, the process steps to block 49. If the answer to this inquiry in 47 is yes, the process continues with a process step (block 48) to execute a proactive failover (described in FIG. 6). The process continues by notifying the user/administrator of the event and logging it, (block 49). The process continues with an inquiry as to whether or not program termination is requested (diamond 50). If the answer to this inquiry is yes, the process cancels all listening processes (block 51) and exits (bubble 52). If the answer to this inquiry is no, the process returns to the step of listening for events via (B) indicating a server or cluster failure described in FIG. 2A (block 31).

Figure 3:
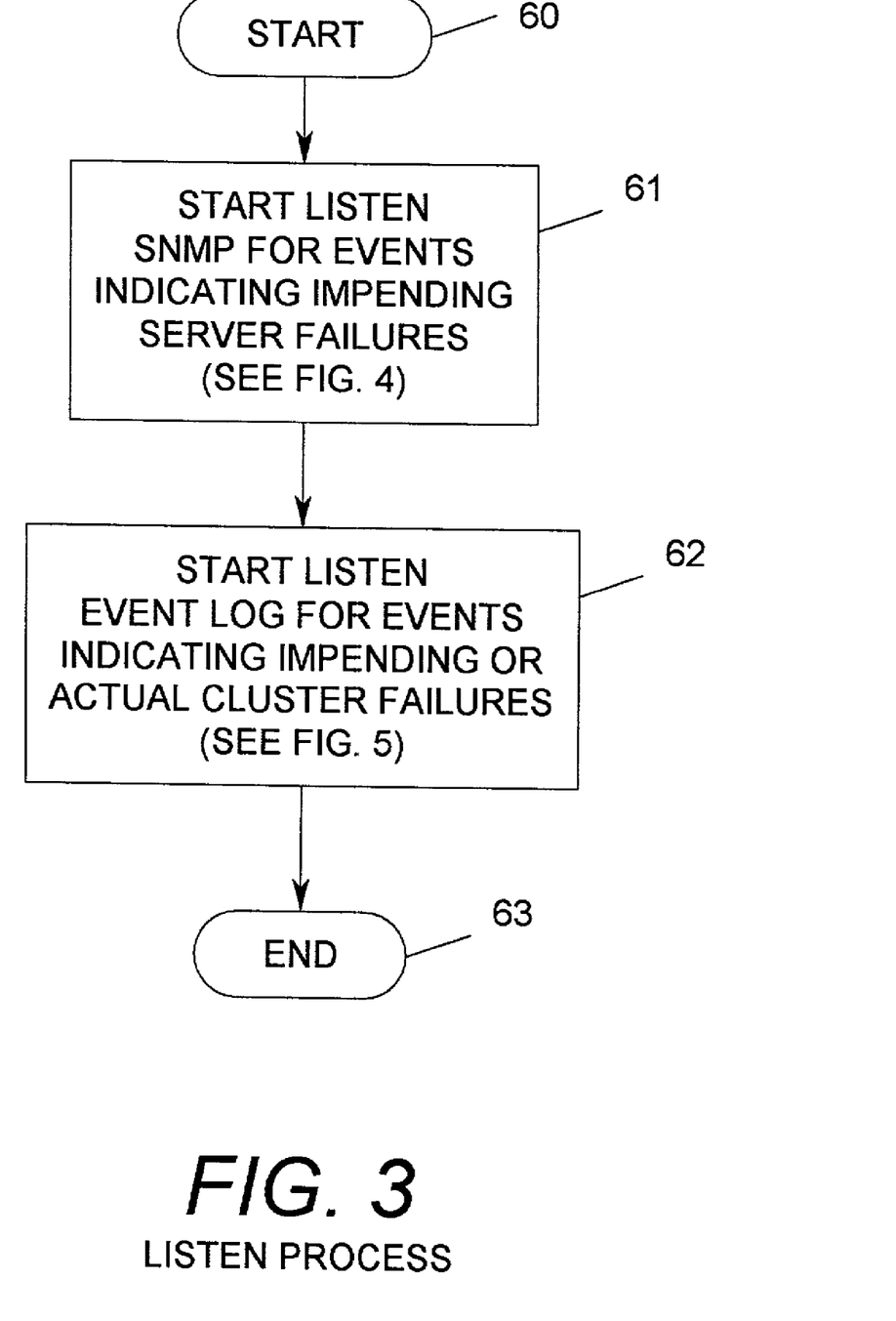
FIG. 3 is a flowchart illustrating the steps for the listen process, which provides an overview of different mechanisms that can be used to capture system and cluster events.

FIG. 3 is a high-level flowchart that describes the listen process. Listening is the term used to indicate the capability by which a management console application can receive traps triggered by SNMP agents. A management console application is required to register with SNMP Trap service (using appropriate Windows API) to receive SNMP traps. The listen process begins with start bubble 60 followed by a process step (block 61) to start listen SNMP for events indicating pending server failures. SNMP stands for "Simple Network Management Protocol". It is an industry-standard protocol that can be used to exchange management information of various network and computer entities (such as hosts, routers and hubs—referred to as "managed entity") with a "management console/client" application (such as HP Openview or IBM NetView or any other application that requests such information). The SNMP listen process is further described in FIG. 4. The process in FIG. 3 continues with another process step (block 62), which starts the listen event log process for events indicating impending or actual cluster failures. The listen event log process is further described in FIG. 5. The process then exits (bubble 63).

Figure 4:
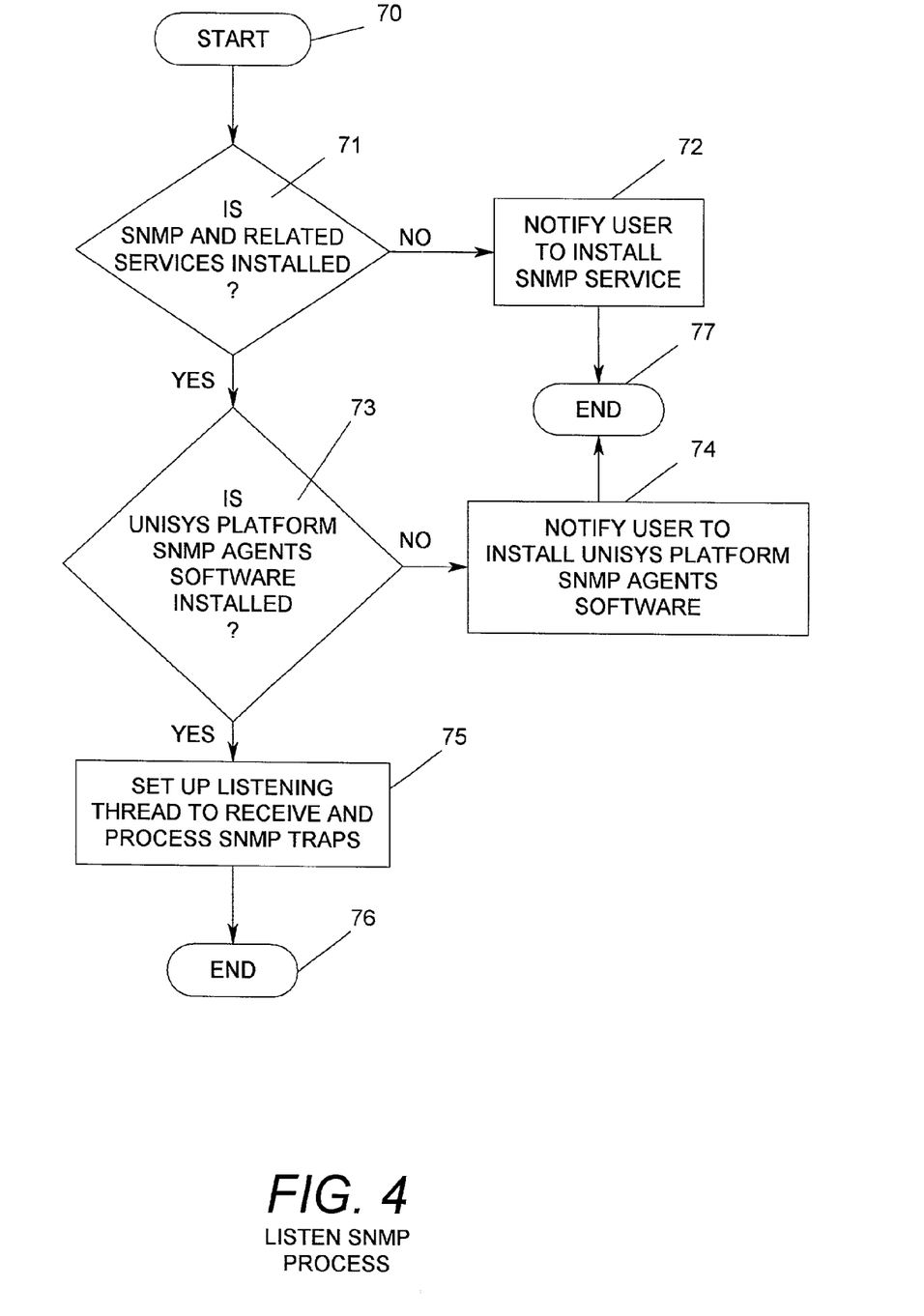
FIG. 4 is a flowchart that illustrates the steps for listen SNMP process, which describes the mechanism of capturing system events from SNMP agents.

Now referring to FIG. 4, a flowchart that illustrates the steps for the listen SNMP process is shown. The process begins with start bubble 70 followed by an inquiry as to whether or not the SNMP service is installed (diamond 71). In the context of the current invention, SNMP service refers to the Microsoft implementation of core SNMP standard as available in Windows 2000 and other Windows operating systems. It is implemented as a Windows "service" (hence it has ability to start running when the system starts and keeps running always unless stopped by user). It facilitates, among other things, communication between the managed entity and the management console application using SNMP standard in Windows operating system environment. If the answer to this inquiry (diamond 71) is no, the process notifies the user to install SNMP service (block 72), which then exits (bubble 77). If the answer to this inquiry is yes, the process continues with an inquiry as to whether or not "Unisys Platform SNMP Agents" software is installed (diamond 73). SNMP Agent (also called extension agent) software is the one that implements/provides the management information of a managed entity to any console/client via SNMP service. In other words, management information about a managed entity is published in the form of an SNMP Agent software. This software provides the capability to monitor system health and trigger SNMP traps when changes in system health condition (as defined by user) are detected. Note that some of the monitoring capabilities of Platform SNMP Agents are also available through a host of other mechanisms and software (both within Unisys Corp. and outside involving both SNMP and other techniques). Any of those solutions may be used in place of "Unisys Platform SNMP Agents" to address the requirements of the current invention as described in this embodiment. If the answer to this inquiry (diamond 73) is no, the process notifies the user to install Unisys SNMP Agents software (block 74), which then exits the process (bubble 77). If the answer to this inquiry is yes, the process sets up a listening thread to receive and process SNMP traps (block 75). The process then exits (bubble 76). An SNMP event (more accurately called a "trap") is a message (along with associated data) sent out by an extension agent (to all management console applications registered to receive them) indicating occurrence of a "special" condition as defined by agent and/or console application. An example would be a trap that is triggered when the available free disk space on a hard disk falls below a pre-defined threshold, say, 10%. Another example that is relevant to this invention is when use of virtual memory in a computer system exceeds a pre-defined threshold, say, 85%. Another Windows service called "SNMP Trap Service" facilitates delivering of traps from an agent to a management console.

Figure 5:
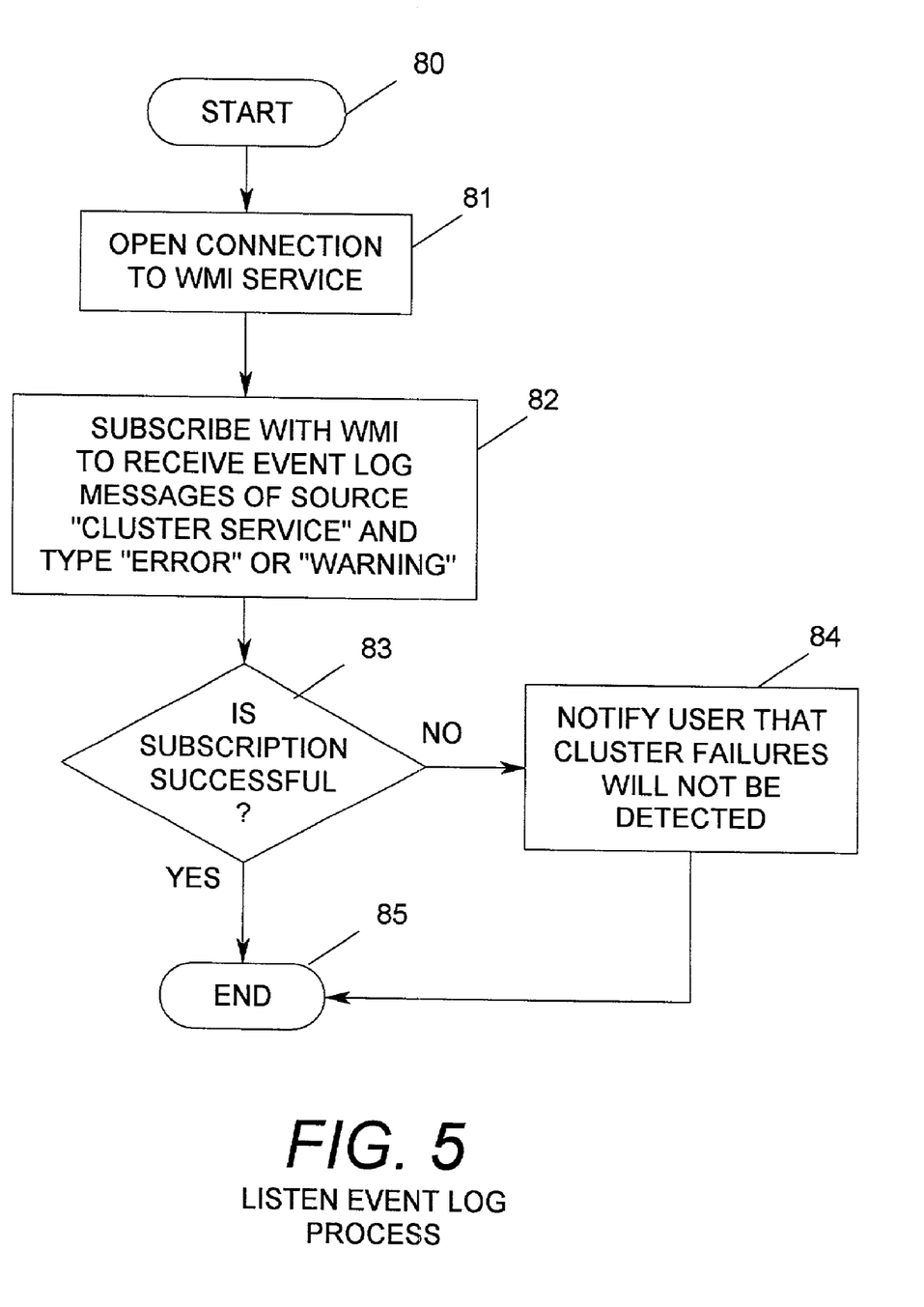
FIG. 5 is a flowchart that illustrates the steps for listen event log process, which describes the mechanism of capturing MSCS cluster events from Windows System Event Log using Windows Instrumentation service available in a Windows operating system.

Referring to FIG. 5, a high-level flowchart for the listen event log process is shown. The process begins with start bubble 80 followed by a process step (block 81) to open connection to WMI service. Windows Management Instrumentation (WMI) is the Microsoft implementation of Web-Based Enterprise Management (WBEM), which is an industry initiative to develop a standard technology for accessing management information in an enterprise environment.

WMI Service is a Windows Service program (available in Windows 2000) and other later operating systems from Microsoft) that is key part of WMI infrastructure that enables exchanging management information between various WMI-based applications.

For example, when a WMI-based management client application requests for, say, amount of free disk space available on a hard drive, all the communication occurs through WMI service. In other words, WMI service is a mediator between a WMI-based management client application and the "data provider".

The process in FIG. 5, block 81, then subscribes with WMI to receive event log messages of source "Cluster Service" and type "Error" or "Warning" (block 82). The process then continues with an inquiry as to whether or not the subscription is successful (diamond 83). If the answer to this inquiry is no, the process notifies the user that cluster failures will not be detected (block 84), and then proceeds to exit (bubble 85). If the answer to the diamond 83 inquiry is yes, the process exits (bubble 85).

Figure 6:
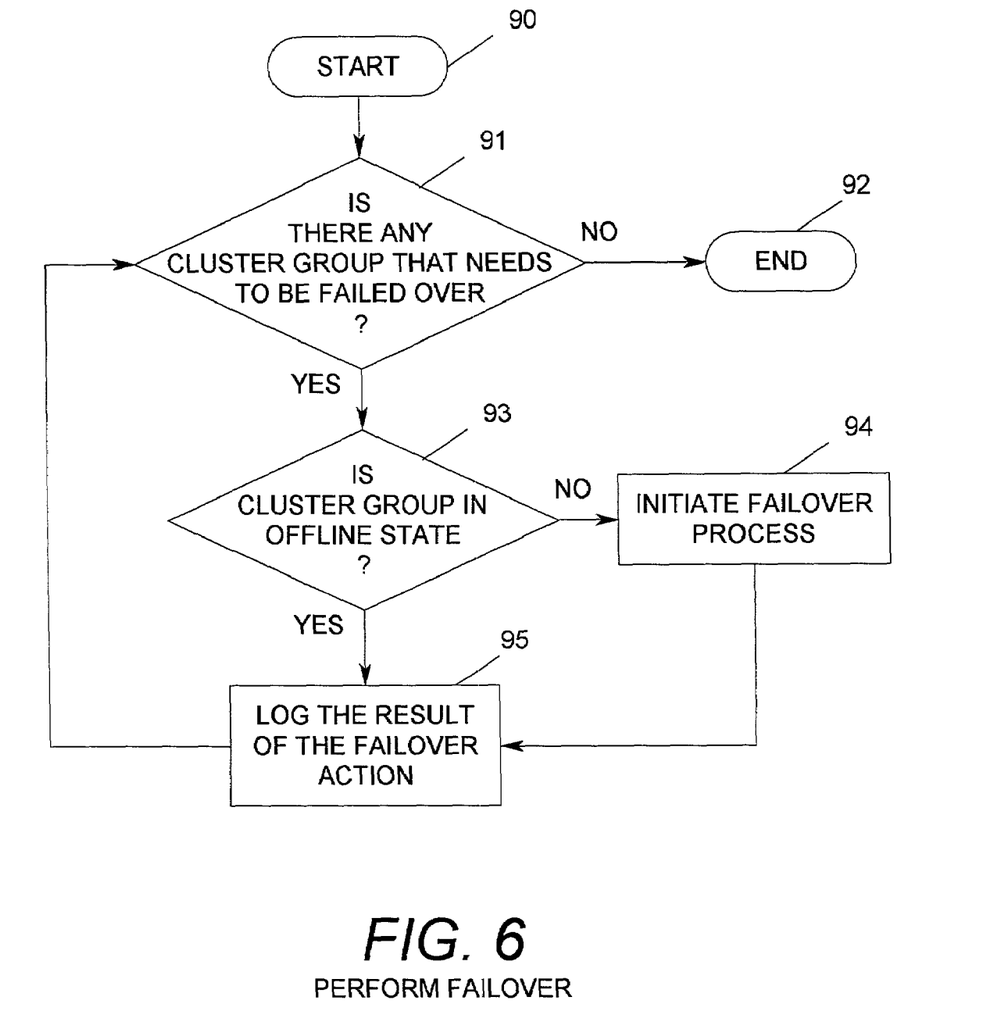
FIG. 6 is a flowchart that illustrates the steps for the perform failover process.

With reference to FIG. 6, a flowchart describing the high-level process of performing failover is shown. The perform failover process begins with start bubble 90 followed by an inquiry step to determine whether or not there is any cluster group that needs to be failed over (diamond 91). If the answer to this inquiry is no, the process ends (bubble 92). If the answer to the inquiry is yes, the process continues with another inquiry as to whether or not there is a cluster group in an offline state (diamond 93). If the answer to this inquiry is no, then the sequence initiates the failover process (block 94), which then proceeds to log the result of the failover action (block 95), and then loops back to the inquiry posed in diamond 91. If the answer to the diamond 93 inquiry is yes, a process is initiated to log the result of the failover action (block 95), which then loops back to the inquiry posed in diamond 91. The process of perform failover continues to loop until there are no more cluster groups that need to be failed over.

Described herein has been a method and system to monitor cluster events in a clustered system and to proactively initiate action when an impending server failure or cluster failure is detected. Further, the method will arrange to take an application residing on a clustered server and make it expeditiously available on the surviving node of a failed server cluster. The ultimate result is greater reliability of operation and considerable reduction in downtime.

Attached herein as Appendix I is a printed document (Chapter 52) entitled Simple Network Management Protocol (SNMP) and Table of Contents published 2002 by Cisco Systems.

Attached as Appendix II is a white paper entitled "Windows Management Instrumentation: Background Overview" published 1999 by Microsoft Corp., One Microsoft Way, Redmond, Wash. 98052.

While a preferred embodiment of the invention has been described, it should be understood that the invention may have other embodiments which still fall within the compass of the attached claims.

What is claimed is:

1. In a computer system including at least two server nodes, each of which can execute clustered server software, a method for monitoring failure situations to reduce downtime, said method comprising the steps of:
   (a) detecting an event causing one of said failure situations;
   (b) determining if said event affects one of said server nodes, and if so;
   (c) determining if said event exceeds a threshold value, and if so;
   (d) executing a proactive failover;
   (e) determining if said event does not affect one of said server nodes, and if so;
   (f) determining if said event affects the condition of the cluster service, and if so;
   (g) identifying and initiating an appropriate action to fix said condition or provide a workaround that will preempt an impending failure of the cluster system, or restart a failed cluster system.

2. The method as in claim 1 wherein said threshold value is selected by a user to represent unacceptable server conditions.

3. The method as in claim 1 wherein said step (a) of detecting said event includes the steps of:
   (a1) listening for an SNMP event;
   (a2) listening for an event log event.

4. The method as in claim 3 wherein said step (a1) of listening for said SNMP event includes the steps of:
(a1a) determining if SNMP service software is installed, and if so;
(a1b) determining if SNMP agent software is installed, and if so;
(a1c) initiating a thread to receive and process SNMP traps.

5. The method as in claim 4 wherein it is determined in step (a1a) that said SNMP service software is not installed, then further comprising the step of:
(a1a1) creating a notification to install said SNMP service software.

6. The method as in claim 4 wherein it is determined in step (a1b) that said SNMP agent software is not installed, then further comprising the step of:
(a2b1) creating a notification to install said SNMP agent software.

7. In a computer system including at least two server nodes, each of which can execute clustered server software, a method for monitoring failure situations to reduce downtime, said method comprising the steps of:
(a) detecting an event causing one of said failure situations said detecting including the steps of:
(a1) listening for a Simple Network Management Protocol (SNMP) event;
(a2) listening for an event log event; wherein said step (a2) for listening for said event log event further includes the steps of:
(a2a) opening a connection to a Windows Management Instrumentation (WMI) service;
(a2b) subscribing to receive event log messages from said WMI service;
(b) determining if said event affects one of said server nodes, and if so;
(c) determining if said event exceeds a threshold value, and if so;
(d) executing a proactive failover.

8. The method as in claim 7 wherein said step (c), of determining if said event exceeds a threshold value, further includes the steps of:
(c1) ensuring said node affected by said event owns a cluster group;
(c2) ensuring there is a remaining node to failover to;
(c3) ensuring said remaining node is clear of critical events.

9. The method as in claim 7 wherein said step (d) of executing a proactive failover includes the steps of:
(d1) initiating a failover process for each cluster group in an offline state;
(d2) logging the result for each of said failover processes.

* * * * *